May 19, 1970 B. W. YOUNG 3,512,206
AIR FLOW SURFACE CLEANING APPARATUS
Filed Aug. 30, 1966 8 Sheets-Sheet 8

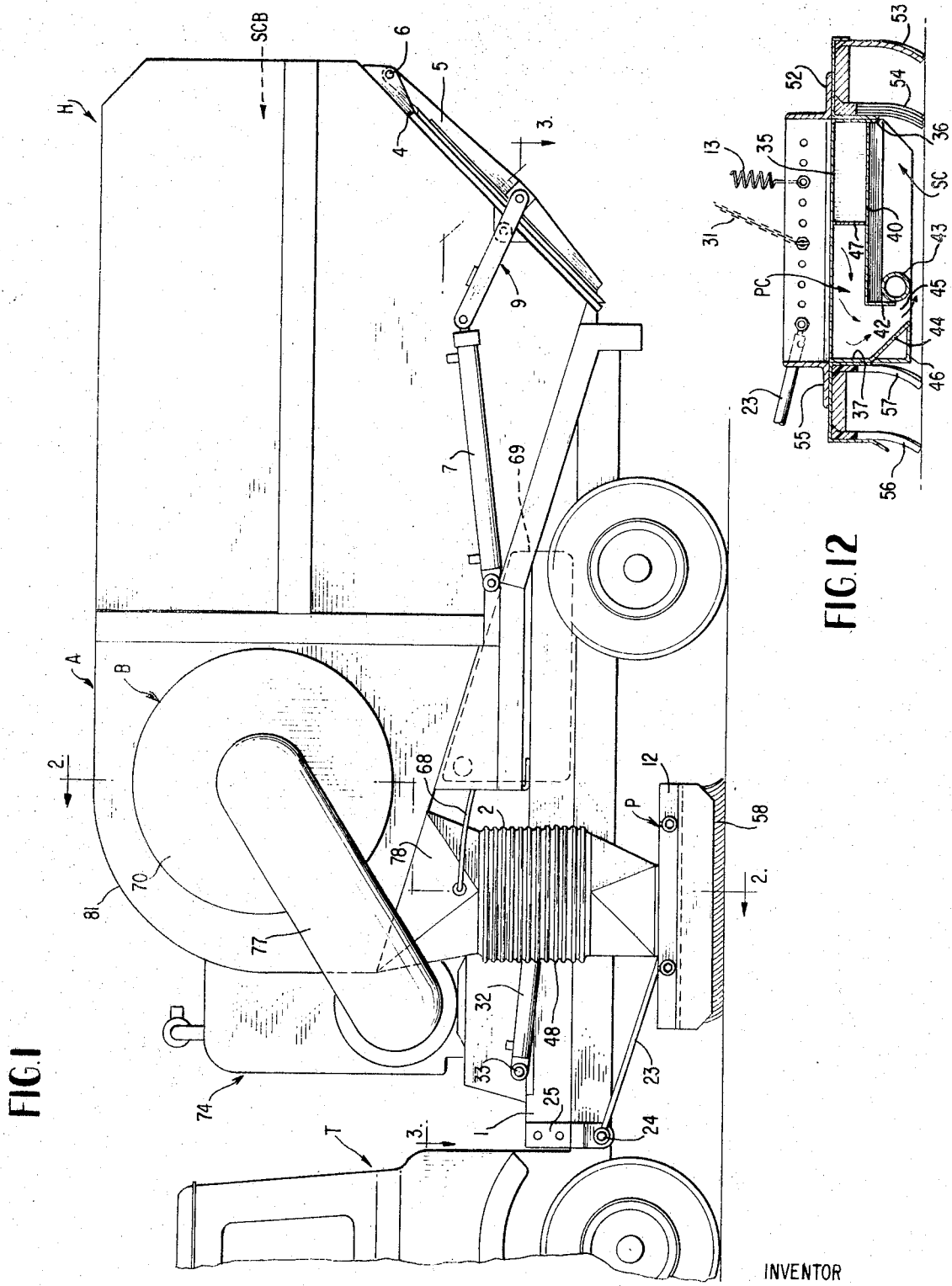

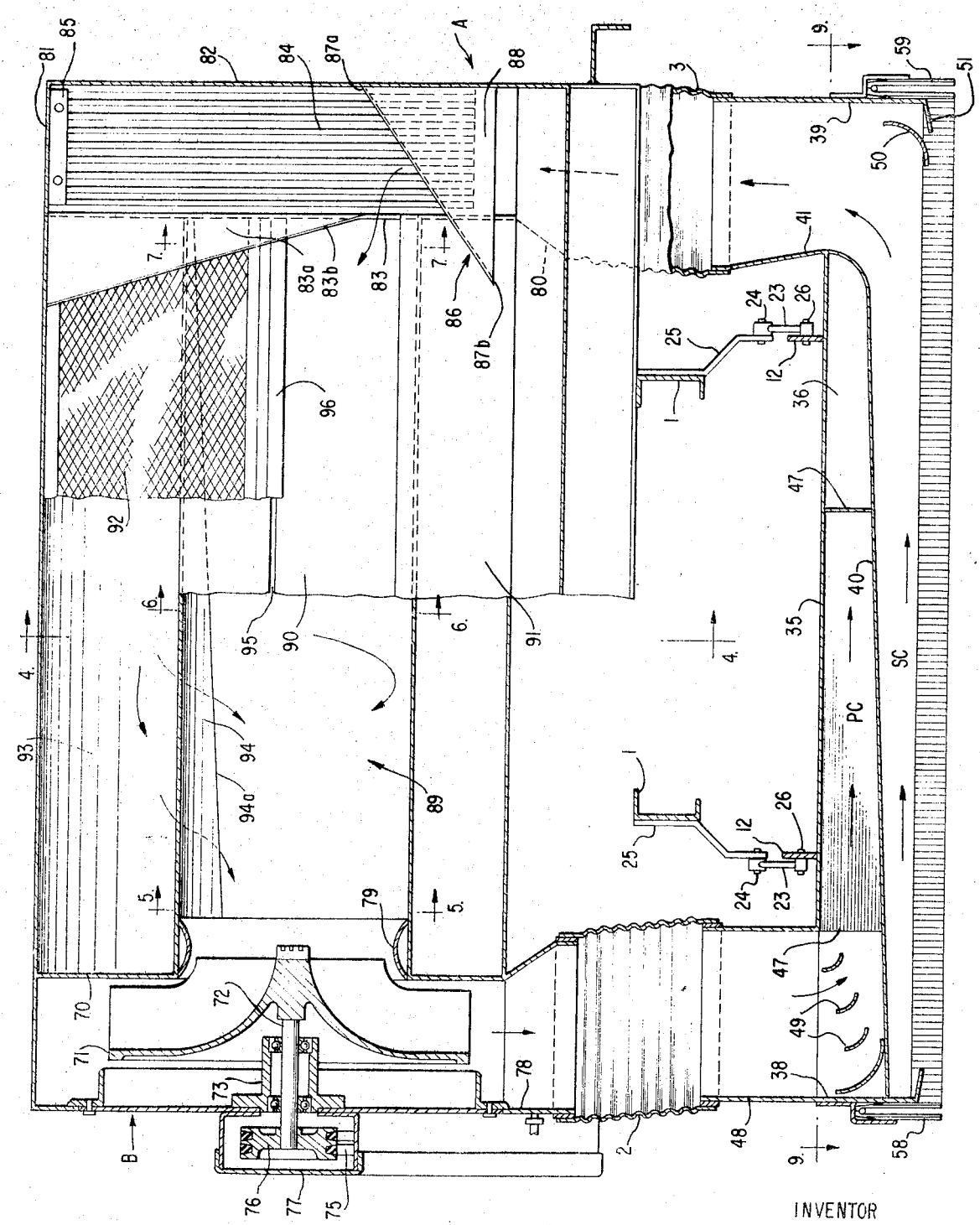

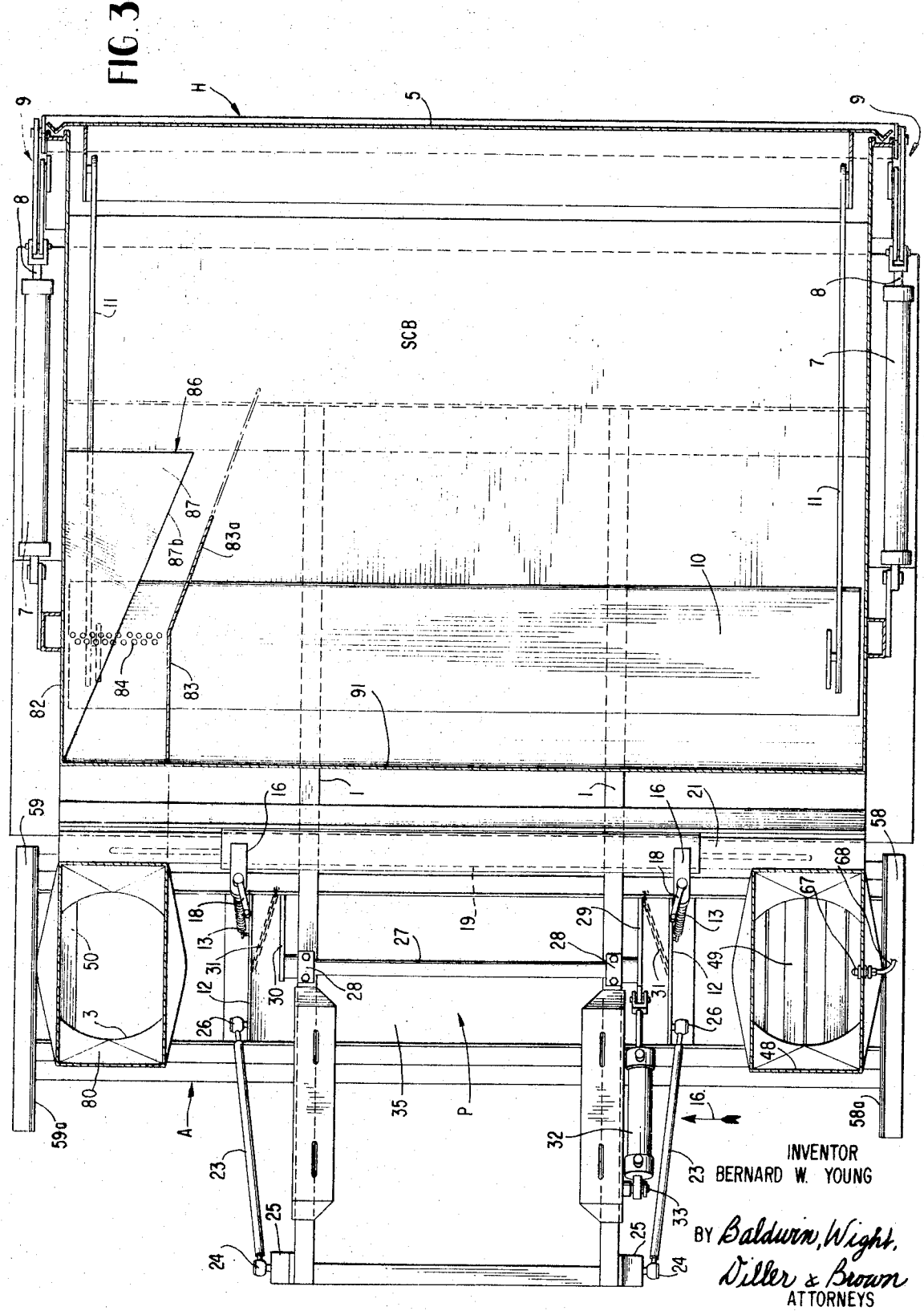

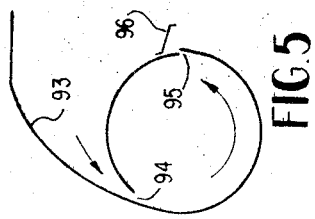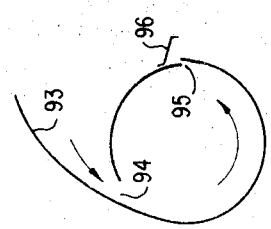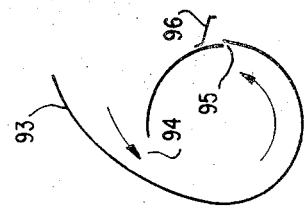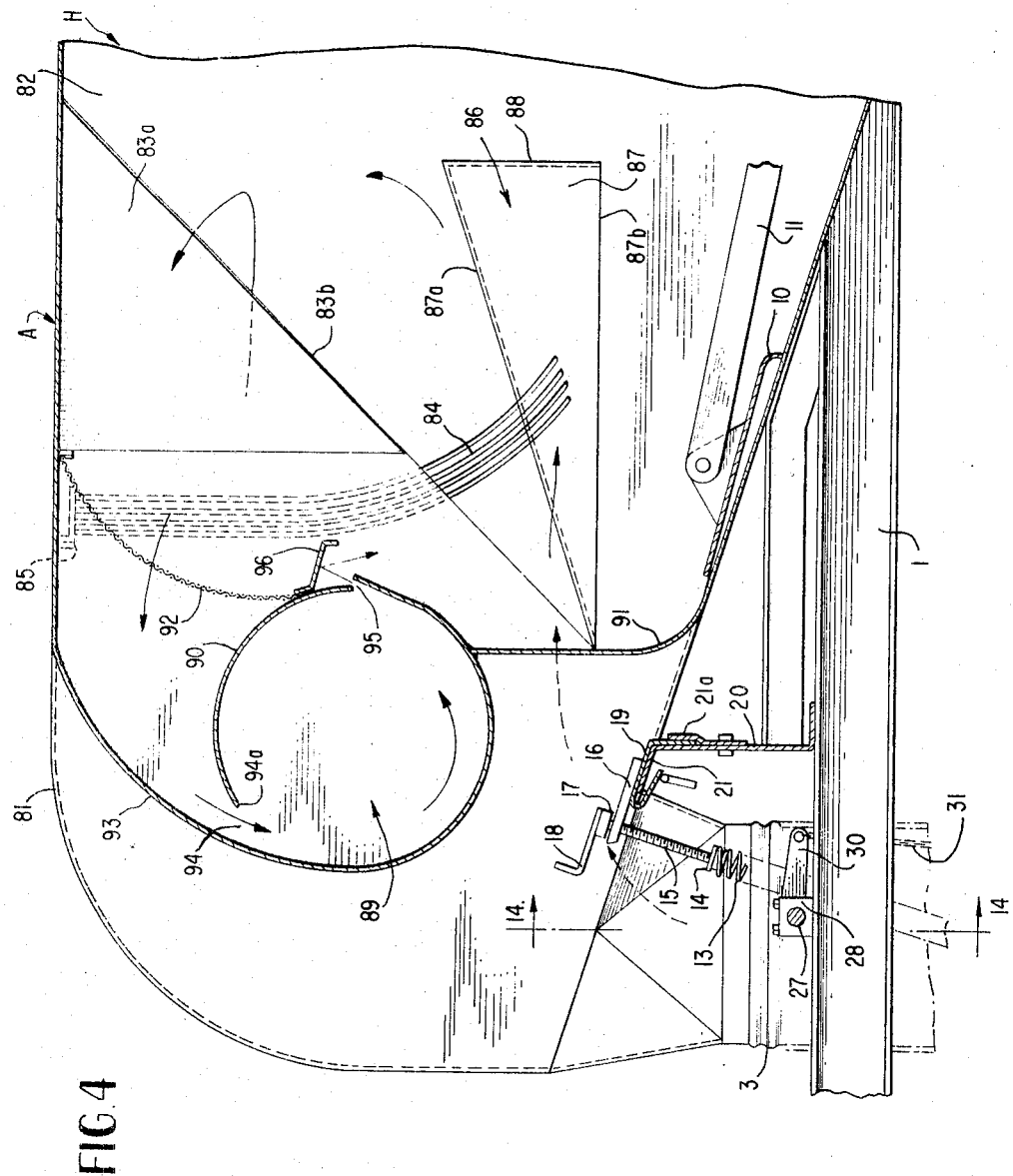

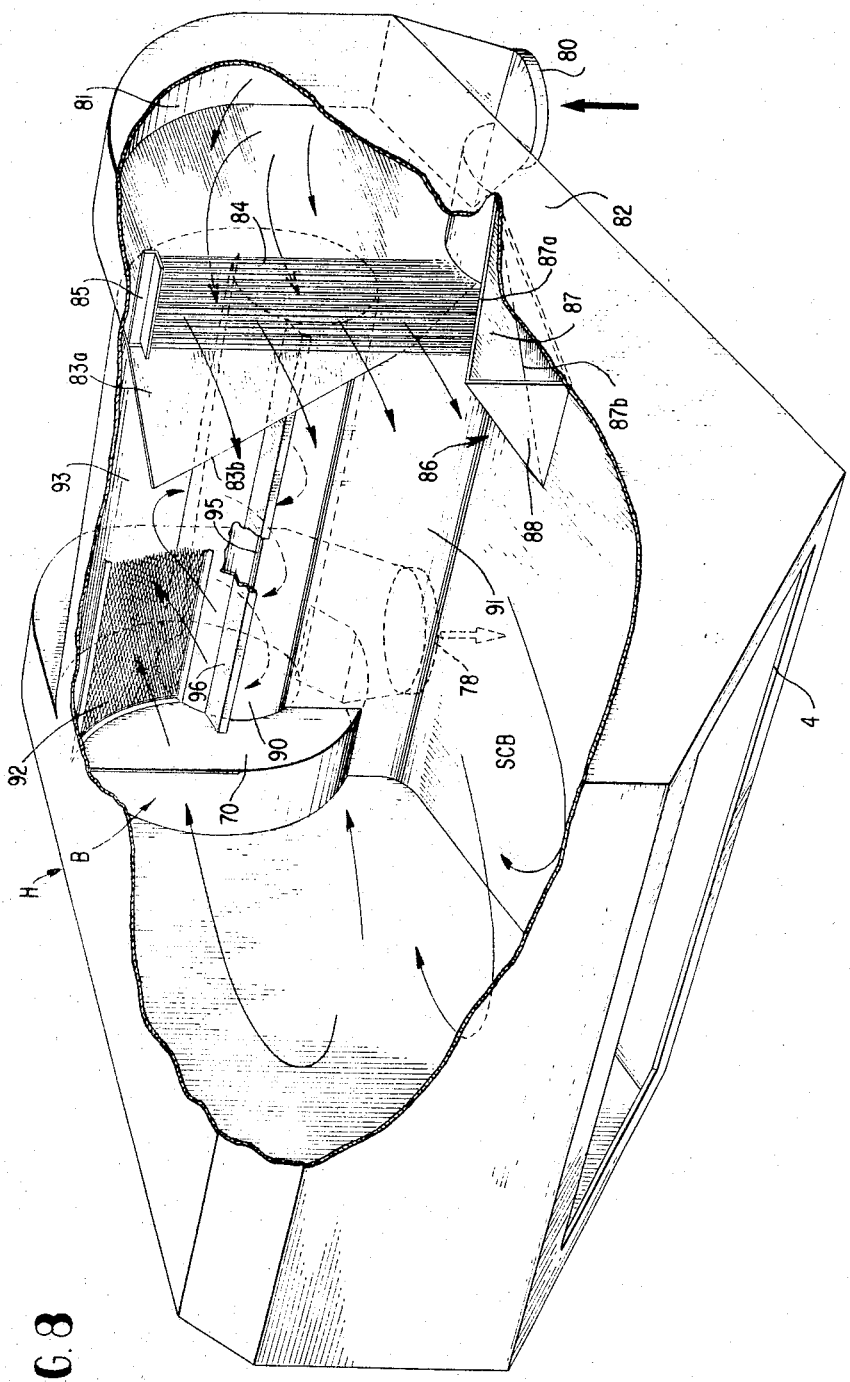

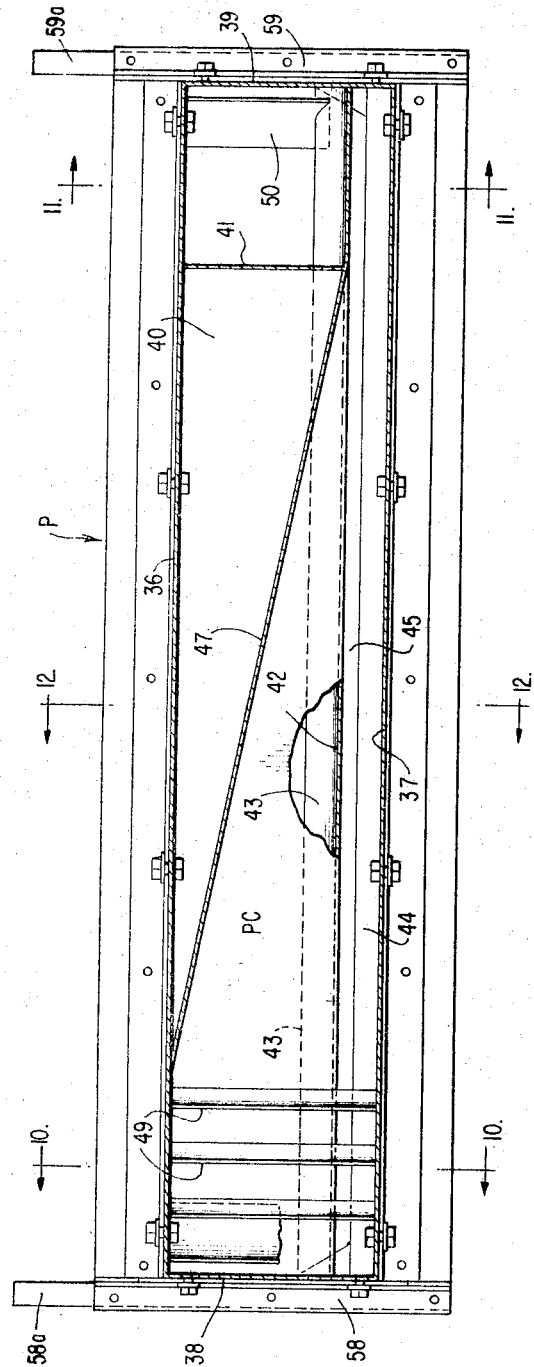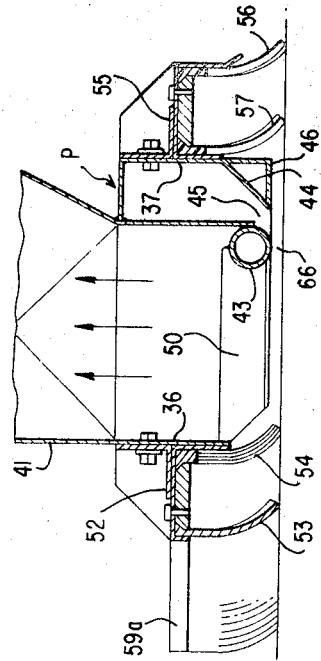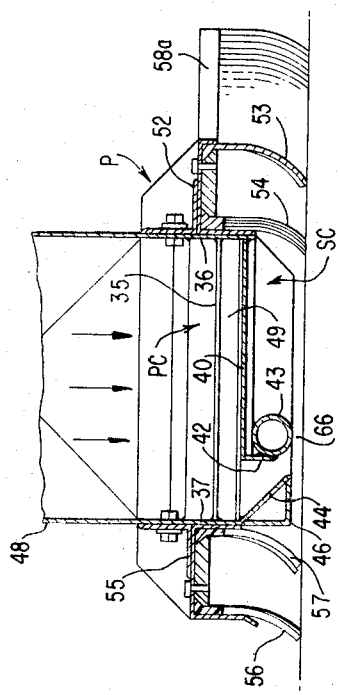

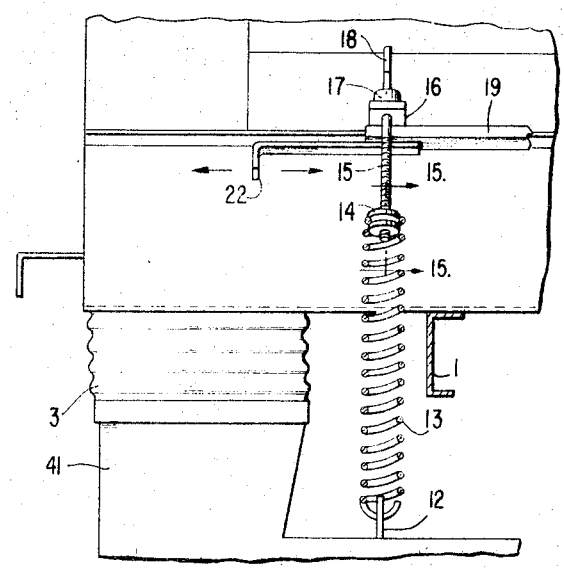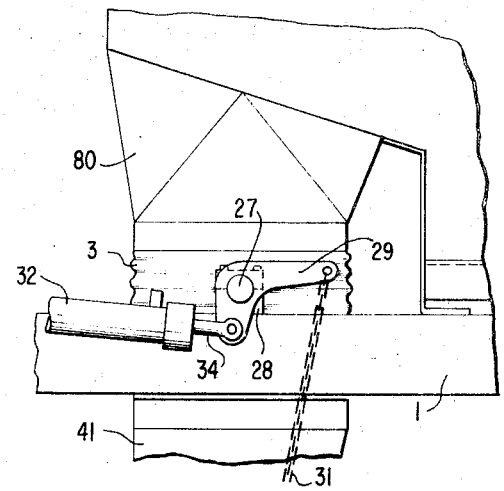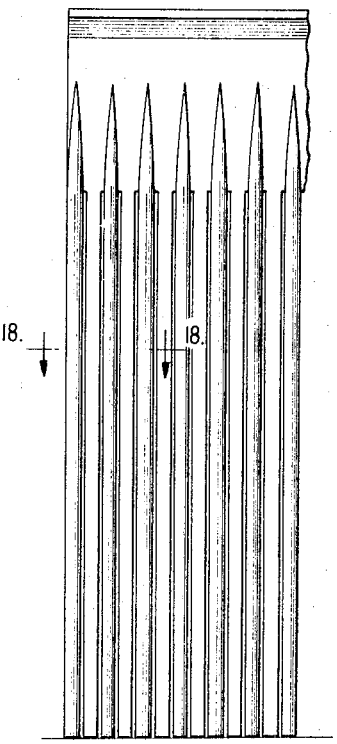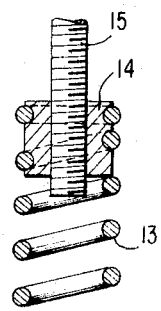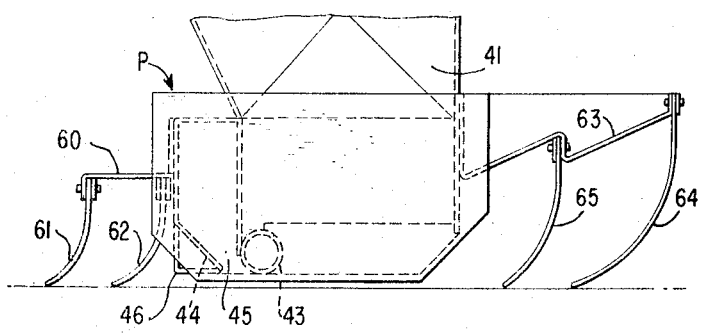

INVENTOR
BERNARD W. YOUNG

BY Baldwin, Wight, Diller & Brown
ATTORNEYS

United States Patent Office 3,512,206
Patented May 19, 1970

3,512,206
AIR FLOW SURFACE CLEANING APPARATUS
Bernard W. Young, P.O. Box 2369, Waco, Tex. 76701
Filed Aug. 30, 1966, Ser. No. 576,063
Int. Cl. A47l 5/14; E01h 1/08
U.S. Cl. 15—346      17 Claims

ABSTRACT OF THE DISCLOSURE

An air flow surface cleaning apparatus includes a pick-up head mounted for movement in a path in the direction of cleaning progress over a surface to be cleaned. A suction chamber within the pick-up head extends transversely of said path. Air under pressure is discharged through orifice means at an inclination forwardly and downwardly along a line adjacent a transverse edge of the suction chamber so as to be deflected from the surface being cleaned into the suction chamber substantially throughout the entire width of the suction chamber. The air is exhausted from one end of the suction chamber so that air flows therein transversely of the cleaning path as well as longitudinally thereof.

---

A pressure chamber receives air under pressure from the outlet of a blower, the air then being discharged under pressure through the orifice means. The suction chamber and the pressure chamber are both of such varying cross section that the air pressure is substantially uniform from one end to the other of the respective chambers.

The pick-up head is provided with flexible ground engaging means which support part of the pick-up head weight, the remainder of the weight being supported by resilient suspension means.

The air and entrained solids picked up from the surface are passed through solids separation equipment including baffle means for precipitating relatively large or heavy objects or particles, and a special form of centrifugal mass-in-motion separator which removes fine particles from the air stream, the cleaned air being recirculated to the blower intake.

This invention relates to air flow surface cleaning apparatus, and more particularly to mobile equipment adapted to be moved over surfaces such as roads, pavements, streets, air strips and the like for removing debris and dust. Various apparatuses of this general class have been known for some time. In one known type, a motorized vehicle is equipped with rotary brushes which dislodge dirt from the surface being cleaned, and with suction equipment for picking up the dirt and delivering it to a collection bin or the like. In some such conntructions, the air with entrained dirt and debris is passed through filters or a bag in the nature of a vacuum cleaner bag for separation of the solids and discharging of the air beyond the filters or bag. In these constructions, air is not recirculated, but fresh air in continuously used to suck up the dirt dislodged by the brushes. In other prior art constructions, air is caused to flow over the surface being cleaned for picking up dirt and debris, and is passed through solids separation equipment for removal of the solids from the air stream which is then recirculated and used again for passing over the surface.

The present invention relates still more particularly to this latter type of air flow surface cleaning apparatus. Factors which are important in the efficient opeartion of such an apparatus are firstly the efficient dislodging of dirt and debris from the surface being cleaned and picking it up without creating an undesirable dunt cloud surrounding the apparatus, and secondly the effective removal of the dust, dirt and larger trash pieces from the air stream before it is recycled to the dislodging and picking up zone.

An object of the present invention is to provide air flow surface cleaning apparatus capable of performing these main functions, that is the dislodging and picking up of dirt and trash and the separation of dirt and trash from the circulating air, more efficiently than has heretofore been possible.

A more particular object of the invention is to provide air flow surface cleaning apparatus including an improved form of dirt and trash pick-up equipment which is so constructed that a blast of air is delivered to impinge upon the surface being cleaned in such a direction as very efficiently to dislodge adhering trash or particles from the surface, and in which the air flow over the surface has multiple directional components so as uniformly to clean the surface and to discharge the air with entrained solids for subsequent solids separation and recirculation of the air.

Other objetcs of the invention will become apparent from the following detailed description of a preferred embodiment, the appended claims, and the accompanying drawings, in which:

FIG. 1 is a side elevational view of a truck carrying apparatus embodying the invention, the front part of the truck cab being broken away;

FIG. 2 is an enlarged scale vertical transverse section on the line 2—2 of FIG. 1, with some parts at the right of the view being shown in elevation as seen from the rear of the apparatus;

FIG. 3 is an enlarged scale horizontal section on the line 3—3 of FIG. 1;

FIG. 4 is a longitudinal vertical section on the line 4—4 of FIG. 2, the rear part of the apparatus being broken away;

FIG. 5 is a reduced scale schematic vertical section on the line 5—5 of FIG. 2, showing only a cylindrical dust separation and blower intake chamber and an appurtenant intake guiding baffle and a solids deflecting baffle;

FIG. 6 is a view similar to FIG. 5, but with the section being taken on the line 6—6 of FIG. 2;

FIG. 7 is a view similar to FIG. 5, but with the section taken on the line 7—7 of FIG. 2;

FIG. 8 is a perspective view from the rear of and above a solids collection bin and housing, partly broken away to show solids separation equipment within the housing;

FIG. 9 is a horizontal section on the line 9—9 of FIG. 2, showing some of the internal construction of a pick-up head;

FIG. 10 is an enlarged scale vertical section on the line 10—10 of FIG. 9;

FIG. 11 is an enlarged scale vertical section on the line 11—11 of FIG. 9;

FIG. 12 is an enlarged scale vertical section on the line 12—12 of FIG. 9;

FIG. 13 is an end elevation of a modified pick-up head;

FIG. 14 is a fragmentary vertical section on the line 14—14 of FIG. 4, showing parts of a spring suspension for the pick-up head in elevation;

FIG. 15 is an enlarged scale detail fragmentary sectional view on the line 15—15 of FIG. 14;

FIG. 16 is a fragmentary elevational view of a pick-up head lifting mechanism as seen when looking in the direction of the arrow 16 in FIG. 3;

FIG. 17 is a fragmentary elevation of a flexible reed-like curtain element unit; the bottom portions of the element being broken away;

FIG. 18 is a section on the line 18—18 of FIG. 17;

GENERAL ORGANIZATION

Figure 19:
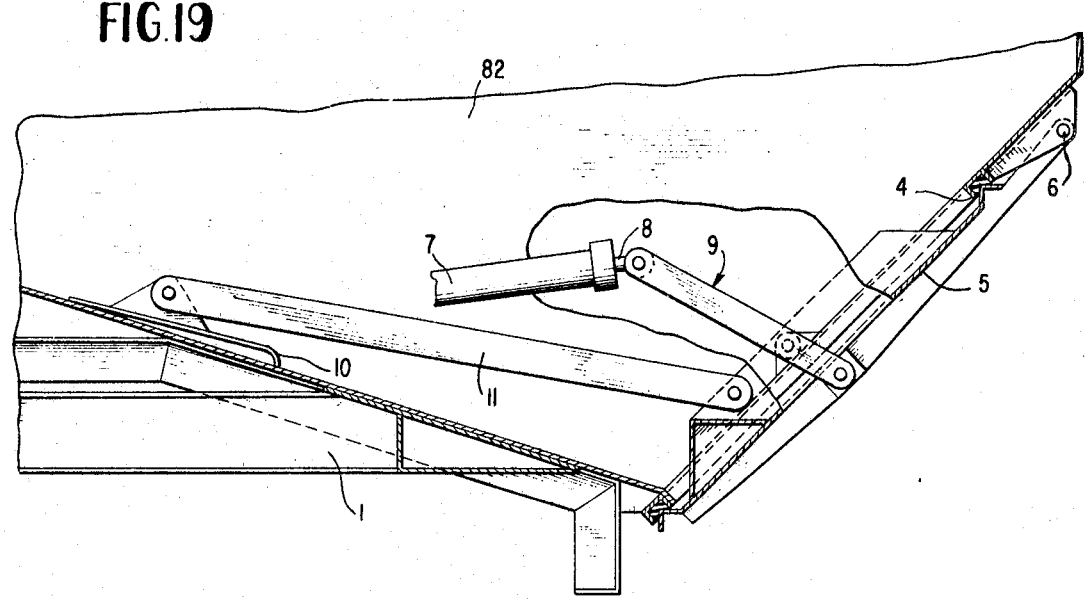
FIG. 19 is a fragmentary horizontal vertical section showing the rear part of a solids collection bin and a closure gate therefor in closed position, mechanism for operating the closure gate being shown in elevation.

As shown in FIG. 1, apparatus generally designated A embodying the invention is carried on a wheeled mobile equipment, specifically a motor truck T. The apparatus includes a frame 1 supporting a housing H providing a solids collection bin SCB. A pick-up head P is floatingly suspended from the frame 1 and extends transversely to the direction of the path of cleaning progress or movement of the truck over and adjacent to the surface to be cleaned.

A blower B is carried by the apparatus housing H at the left side of the latter. In this description, references to the left side of the equipment apply to the side of the equipment at the left side of the truck, that is the driver's side, whereas references to the right side of the equipment, of course, apply to the opposite side thereof.

The blower B is arranged to discharge air under pressure through a pressure duct 2 to the pick-up head P which, as will be explained in detail below, is so constructed that the air under pressure is delivered through orifice means in a forceful flow downwardly against the surface to be cleaned under the pick-up head and flows over that surface both parallel to the direction of cleaning progress and transversely to that direction, being finally passed to the right side of the pick-up head from which it is exhausted through a suction or exhaust duct 3 and delivered into the solids collection bin SCB which is of very large volume. The air and entrained solids having reached the large volume solids collection bin slow down, so to speak, permitting a major part of the entrained solids to drop to the bottom of the bin. The air, still containing some entrained solids, then is delivered to the blower intake for recirculation through the pick-up head. In the course of its flow from the right end of the pick-up head, the air encounters and passes through or beyond solids separation equipment which effects supplemental solids separation, removing from the air stream particles, mainly very fine dust or light trash which does not readily drop out of the relatively slowly moving air in the large volume collection bin.

The housing H has a rearwardly and downwardly slanting bottom as shown in FIGS. 4, 8, 19 and 20, and a rear wall which is provided with a dump opening 4 normally closed by a closure gate 5 hinged to the housing at 6. The closure gate 5 is movable to open position by power operated means comprising, on each side of the housing, a hydraulic cylinder 7 pivoted at one end to the housing, and an associated piston rod 8 which is pivoted to one end of a knuckle linkage 9, the other end of which is pivoted to the gate 5. When the piston rod 8 is retracted into the cylinder 7, it will pull the linkage 9 to swing the closure gate 5 to the position shown in FIG. 19. The gate 5 may be swung to its open or dumping position by admitting fluid under pressure into the cylinder 7 to extend the piston rod 8 and move the parts to the positions shown in FIG. 20.

To ensure that substantially all solids collected on the bottom of the bin SCB will be removed when the gate 5 is opened, a raker plate 10 is mounted to extend transversely across the bin bottom and to rest upon the bottom. Two links 11 pivoted at their front ends to the raker plate 10 and at their rear ends to the gate 5 pull the raker plate 10 rearwardly toward the dump opening 4 in response to movement of the gate 5 to its open position.

Arrows shown in the drawings indicate generally the directions of air flow in various parts of the apparatus.

PICK-UP HEAD

FIGS. 1, 2, 3, 9, 10, 11 and 12 illustrate the construction of the pick-up head P itself. The mounting of the pick-up head, including its floating suspension, the arrangement for towing or pulling the pick-up head, and mechanism for raising the pick-up head clear of the ground to an inoperative position, is illustrated particularly in FIGS. 1, 2, 3, 4, 14, 15 and 16.

The pick-up head P preferably is formed basically of sheet material. The internal construction of the pick-up head, which forms an important part of the present invention, is described in detail hereinafter. At this point, the description will be directed principally to the mounting of the pick-up head. The pick-up head is provided with two fore and aft extending bars 12 respectively located adjacent to the ends of the head as shown in FIGS. 2 and 3. The bars 12 are connected to the lower ends of springs 13, the upper ends of which are anchored to nuts 14, as best shown in FIG. 15. The nuts 14 are received on threaded rods 15 which extend upwardly through brackets 16 which are normally stationary, but which may be adjusted transversely as explained below. Above the brackets 16, the rods 15 are provided with fixed collars 17 supported by the brackets 16. By rotating the threaded rods 15 by handles 18, the vertical positions of the nuts 14 may be changed so as to apply varying amounts of tension to the springs 13 when the pick-up head P is resting upon the surface to be cleaned. When the pick-up head is so positioned, part of its weight is carried by the suspension springs 13 and the remainder of its weight is carried by the pick-up head itself in contact with the surface. As will be explained hereinafter, the pickup head is equipped with flexible ground engaging elements. By varying the suspension effect of the springs 13, the degree of flexing of the flexible elements on the pick-up head and the pressure exerted on the surface by the flexing ground engaging elements may be controlled.

In order that the pick-up head may be shifted transversely of the direction of cleaning progress, for example to position one of its end close to a curb, the springs 13 and threaded rods 15 and appurtenant parts are mounted for transverse adjustment as best illustrated in FIGS. 3, 4 and 14. A supporting slide 19 is mounted on a frame cross member 20 having a forwardly extending inclined top flange 21. The slide 19 has a top part which rests upon the flange 21, a reversely turned flange which extends under the flange 21 and a downwardly extending flange which lies against the top part of the cross member 20. The cross member 20 is provided with a keeper plate 21a which fits against the back of the downwardly extending flange of the slide 19. The arrangement is such that the slide 19 can be moved transversely on the cross member 20 when the weight of the pick-up head on the springs 13 and threaded rods 15 is relieved. When, however, the springs 13 and threaded rods 15 are again called upon to carry part of the weight of the pick-up head, the canting of the slide 19 relative to the cross member 20, flange 21 and keeper plate 21a locks the slide in its position of transverse adjustment. Movement of the slide 19 transversely is facilitated by a handle 22 shown in FIG. 14.

As shown in FIGS. 1, 2, 3 and 4, the pick-up head P towed or pulled over the surface to be cleaned by two connecting rods 23 pivoted at 24 to frame mounted brackets 25 and pivoted at 26 to the bars 12 on top of the pick-up head P.

When the apparatus is to be transported without being used for cleaning a surface, the pick-up head should be raised clear of the ground so as to avoid unnecessary wear and permit rapid transport. Operating means for raising the pick-up head to an inoperative position is illustrated in FIGS. 3, 4 and 16, in which is shown a cross shaft 27 mounted for rocking in bearings 28 carried by the frame. At its left end, the shaft 27 is provided with a bell crank 29, and at its right end it is provided with a bell crank 30. Chains 31 having their upper ends connected respectively to one arm of the bell crank 29 and to the arm 30 are connected at their lower ends to the bars 12 on the top of the pick-up head P. Rocking of the shaft 27 counterclockwise as viewed in FIGS. 4 and 16, will lift the chains 31 and the pick-up head. The shaft 27 is rockable by means of a hydraulic cylinder 32 pivoted at 33 to the frame and an associated piston rod 34 connected to the depending arm of the bell crank 29. Extension of the piston rod 34 will rotate the shaft counterclockwise as required for raising the pick-up head clear of the ground, and retraction of the piston rod into the cylinder will lower the pick-up head to be floatingly suspended by the springs 13.

Referring now more particularly to the construction of the pick-up head as illustrated in FIGS. 1, 2, 9, 10, 11 and 12, the head is of generally box-like structure which may be formed of sheet material, the parts being joined together in any suitable manner as by conventional fastening devices, not shown, or by welding. The head comprises a top wall 35, a front wall 36, a rear wall 37, a left end wall 38, and a right end wall 39. The bottom of the pick-up head, considered in its entirety, is open.

A generally horizontal but definitely sloping partition wall 40, spaced below the top wall 35 and above the bottom of the head P, extends from the left end wall 38 toward the right end of the head adjacent to which it merges with a transition 41 connected to the suction duct 3 as shown in FIG. 2. As shown in FIG. 2, the partition or wall 40 slopes upwardly from the left end of the head P, that is the head end under the pressure duct 2, toward the top wall 35. Consequently, the cross sectional area below the sloping wall 40 increases from left to right and vice verse decreases from right to left.

As shown in FIGS. 10 and 12, the sloping partition wall 40 is joined along its front edge to the front wall 36 of the head P, but the rear edge of the wall 40 is turned down to form a flange 42 which is spaced forwardly of the head rear wall 37. A tube 43, which is welded or otherwise connected to the end walls 38 and 39 for strengthening the structure, is disposed below the partition 40 and just in front of the downwardly turned flange of the latter. The lower part 44 of the head rear wall 37 is turned forwardly at an inclination at 44 and terminates in closely spaced relation to the flange 42 and tube 43 to provide a slot-like nozzle opening 45 through which air is caused to flow under pressure from above the partition 40 to the space between the latter and the surface being cleaned. A reinforcing angle member 46 is secured to the head structure to extend alongside the inwardly turned or inclined part 44 for maintaining the latter in definitely spaced relation to the flange 42 and thus maintain the orifice opening 45 constant.

A vertical partition wall 47 is mounted within the head P between the top wall 35 thereof and the sloping horizontal partition wall 40. As shown in FIG. 9, the vertical parition wall 47 is inclined with respect to the front and rear walls 36 and 37, the left end of the vertical wall 47 being joined to the front wall 36 adjacent to but spaced from the left end wall 38, and the right end of the partition wall 47 being joined to the transition 41 underlying and being connected to the suction duct 3. The inclined vertical wall 47 divides the space between the top wall 35 and the sloping horizontal partition wall 40 into two separate chambers. One of these chambers is defined by the front wall 36, the inclined wall 47, the horizontal wall 40, the top wall 35, and the transiton 41. This particular chamber has no function in the operation of the pick-up head. The second chamber is at the rear of the inclined vertical partiton 47 (to the bottom of this partition as shown in FIG. 9), and constitutes a pressure chamber PC which receives air under pressure from the duct 2.

Air under pressure in the chamber PC is discharged downwardly and at a forward inclination through the slot-like orifice 45 to impinge upon the surface being cleaned so as to loosen dirt and direct it forwardly under the horizontal partition 40 which serves as the top of a suction chamber SC. With reference to FIGS. 10, 11 and 12, the flange 42 and tube 43 are disposed horizontally between the orifice 45 and the suction chamber SC, parallel to the orifice, immediately adjacent to the suction chamber rear edge and immediately in front of the orifice means 45, and together act as air guiding means to guide the air stream to flow horizontally into the suction chamber, entering the latter at a level spaced below the suction chamber top wall 40. This suction chamber is of uniform width fore and aft throughout its extent from end to end of the pick-up head P. However, because of the slope of the wall 40 at the top of the suction chamber SC, this chamber increases in height and hence in cross section from the left end of the pick-up head P to the right end of the head.

In operation, air delivered under pressure by the blower B flows downwardly through the pressure duct 2 and a transition 48 into the left end of the pressure chamber PC. Air flow direction changing vanes 49 at the bottom of the transition 48 turn the air flow smoothly from vertical to horizontal to flow toward the right in the pressure chamber PC. There being air under pressure throughout the pressure chamber PC, air is discharged through the slot orifice 45, all of the air discharged by the orifice flowing downwardly and forwardly into the suction chamber SC, loosening dirt and trash from the surface being cleaned and carrying the dirt and trash into the suction chamber. Air with entrained solids is withdrawn from the right end of the suction chamber SC through the transition 41 and suction duct 3 to be delivered to the solids collection bin SCB and subjected to solids separation treatment by equipment to be described hereinafter. Since air enters the suction chamber in a generally forward direction from the orifice slot 45, and since air is withdrawn from the suction chamber at its right end, there is a compound flow of air in the suction chamber, that is air flow having directional components both transverse to the direction of cleaning movement and approximately parallel to that direction. The compound directional flow of air over the surface being cleaned has been found to be much more effective in loosening dirt and trash from the surface than a flow of air substantially in one direction only. A particle of trash adhering to the surface being cleaned may be and often is more easily dislodged from the surface if attacked by a current of air passing in one direction than by a current of air passing in any of a number of other directions. By virtue of the complex air flow, that is flow with different directional components, in the suction chamber SC and over the surface being cleaned, all adhering particles of trash and dirt will sooner or later be subjected to air flow in the direction best calculated to dislodge the particles.

It is desirable that when the air stream flows from the right end of the suction chamber SC upwardly into the transition 41, its change of flow direction from horizontal to vertical be accomplished smoothly so as to avoid eddy currents and agitation which might permit heavier trash particles to drop back onto the surface being cleaned. For this purpose, a flow direction changing vane 50 is mounted near the bottom of the right end of the pick-up head P below the transition 41. As shown in FIG. 3, the vane 50 is spaced diagonally downwardly-outwardly from the junction of the suction chamber top wall 40 with the portion of the duct 2 which is spaced inwardly from the suction chamber end extremity, at the right in FIG. 3, the cross sectional area of the space between the vane 50 and the aforesaid junction being less than the cross sectional area of the exhaust duct 2 above the suction chamber SC. A baffle 51 extends inwardly from the right end wall 39 part way under the vane 50 to prevent any large pieces, for example rocks, from being drawn upwardly and becoming lodged between the direction changing vane 50 and the end wall 39.

The pick-up head P is equipped with marginal flexible ground engaging curtains which serve to enclose the sides and ends of the suction chamber SC and to scrape the surface being cleaned to assist in loosening dirt for being picked up in the air stream flowing in the suction chamber. As shown in FIGS. 10, 11 and 12, a front curtain mounting plate 52 is secured to the front wall 36 of the head P and supports a curtain assembly comprising an outer or front component 53 and an inner or rear component 54 spaced from the front component 53. Preferably, the front component 53 is formed of a continuous sheet of flexible material such as heavy rubber or rubber substitute, webbing or the like, and the inner component 54 is preferably constituted by an assembly of individual flexible fingers somewhat in the nature of heavy brush bristles. Units of the kind shown in FIGS. 17 and 18, which may be constituted by flexible plastic fingers, serve this purpose well.

Secured to the rear wall of the pick-up head P is a rear mounting plate 55 which supports a curtain assembly comprising an outer component 56 and an inner component 57. The component 56 may be constituted by a solid sheet of flexible material such as the component 53 at the front of the head, and the inner component 57 may be constituted by a curtain of individual flexible fingers such as the fingers 54. In both curtain assemblies, the inner curtain components are spaced from the outer curtain components.

At the left end of the pick-up head is an end curtain 58 preferably constituted by closely contiguous individual flexible fingers, and at the right end of the pick-up head there is a curtain 59 of similar construction. Both end curtains 58 and 59 project forwardly at 58a and 59a beyond the front wall 36 of the pick-up head P, the arrangement being such that the forwardly extending curtain portions 58a and 59a inhibit the rolling or flow of trash lengthwise of the leading front curtain component 53 beyond the ends of the pick-up head. Thus, the extended side curtains 58a and 59a hold or confine such larger trash pieces to roll or be pushed along in front of the outer curtain 53 until in time such pieces find their way under the front curtain 53 so that they may be picked up by the suction air stream and carried out through the transition 41 and delivered to the solids collection bin SCB.

The pick-up head P is surrounded by the flexible marginal curtain elements which contact the ground and bear part of the weight of the pick-up head, the remainder of the weight being carried by the springs 13 as previously explained. The marginal curtain elements partially seal the suction chamber at its bottom so that the desired flow of air through the pick-up head is maintained. Being flexible, the curtains can be lifted locally by relatively large pieces of trash such as cans and bottles, which are thereby enabled to move into the suction chamber and be carried away by the air stream. The use of flexible individual finger curtains in at least some of the curtain components is usually desirable since these components are particularly effective in assisting the loosening of adhering dirt. Although the fingers have spaces between them, they nevertheless additionally provide curtains preventing uninhibited or unrestricted air flow.

FIG. 13 shows a modified arrangement of curtains particularly adapted for use in removing very light trash, such as leaves, from surfaces to be cleaned. The basic pick-up head structure P shown in FIG. 13 is essentially similar to the pick-up head structure described above. However, in the FIG. 13 arrangement, the rear curtain assembly includes a plate 60 which mounts curtain components 61 and 62 essentially similar to the previously described curtain components 56 and 57. At the front of the pick-up head shown in FIG. 13, a mounting plate 63 is secured to the head and extends forwardly and upwardly so as to mount curtains 64 and 65 of greater vertical extent and spaced forwardly from the pick-up head P further than the curtains 53 and 54 described with reference to FIGS. 10, 11 and 12. Because of the mounting of the curtain components 64 and 65 substantially out in front of the pick-up head P, and further because of the greater height of the curtain components 64 and 65, leaves and like trash may more easily enter between the components 64 and 65 and pass into the suction chamber SC.

Briefly reviewing the operation of the pick-up head, air under pressure supplied by the blower B is delivered downwardly through the pressure duct transition 48 at the left of the pick-up head and is turned by the vanes 49 to flow toward the right into the pressure chamber PC. Air under pressure in the pressure chamber flows downwardly through the slot-like blast venturi orifice 45 continuously throughout its length. The rear wall part 44 defining the rear of the blast venturi slot 45 is at such an inclination that the blast of air emerges from the orifice 45 at an angle of approximately 45° to the surface being cleaned, thus impinging forcibly upon the surface to loosen dirt and then flowing under the tube 43 at the front of the nozzle opening 45 and entering the suction chamber SC. The entire discharge from the orifice 45 is spaced below the top wall 40 of the suction chamber. Best results have been obtained by positioning the tube 43 vertically so that the vertical area of the space 66 between the bottom of the tube 43 and the surface being cleaned is approximately 70%–80% of the largest flow area of the suction outlet 41. In most installations, the vertical distance of the bottom surface of the tube 43 above the surface being cleaned is one inch to two inches.

In order that the jet air stream of ribbon-like character passing downwardly through the orifice 45 be substantially uniform in velocity throughout the length of the orifice 45 so as to achieve substantially uniform cleaning of the surface, it is necessary for the pressure of the air in the pressure chamber PC to be substantially uniform from one end of the chamber to the other. This required substantially uniform pressure in the chamber PC is maintained as a result of the decreasing cross sectional area of the chamber PC from its left end adjacent to the pressure air delivery to its right end adjacent to the suction outlet. The progressive decreasing of the cross sectional area of the pressure chamber PC is due firstly to the inclination of the vertical partition wall 47 which converges upon the wall 37 from left to right, and secondly to the upward slope of the horizontal partition wall 40 from left to right.

The upward slope of the horizontal wall 40 also causes the cross sectional flow area in the suction chamber SC to increase from left to right, that is from the end of the pick-up head P at which air is delivered under pressure to the opposite end thereof from which air is exhausted by suction. Inasmuch as the amount of air flowing through the suction chamber SC increases from left to right due to the discharging of air continuously along and under the tube 43, the increasing of the cross sectional area of the suction chamber from left to right eliminates crowding of air at the right end of the suction chamber with increased pressure, and maintains both the air pressure and air velocity substantially constant throughout the left to right length of the suction chamber.

The provision of a space between each pair of front and back curtain components, for example the space between the components 53 and 54, permits air to move both transversely and longitudinally between the components. This facilitates collection of trash and ultimate delivery of the trash into the suction chamber SC. Thus, if trash is temporarily trapped between the curtain components 53 and 54, and if the curtain 54 is lifted or deflected upwardly at one point, due, say, to encountering a bottle or rock, dust and smaller pieces of trash can move longitudinally of the curtains to the point at which the curtain component 54 is lifted for ready entry into the suction chamber. The types of curtains used both fore and aft of the pick-up head may be changed so as best to suit different cleaning conditions, for example very dusty streets with little large trash, or streets on which there is considerable trash of the nature of cans, bottles, rocks or the like.

Under normal conditions, when a surface to be cleaned does not present a very large amount of very dry fine dust, the pick-up head P operates with practically no dusting of the air outside of the head. However, when the surface to be cleaned is fouled with a great deal of very fine dry dust and the atmosphere is very dry, there may be some tendency for dust stirred up by the curtains to rise into the atmosphere. This may be substantially eliminated by spraying atomized moisture into the circulating air. For this purpose, an atomizing nozzle 67 is shown in FIG. 3 mounted in the pressure transition 48. A hose 68 supplies moisture to the nozzle 67 from a tank 69, suitable means, not shown, being provided for delivering water to the nozzle 67 under atomizing pressure.

AIR RECIRCULATION AND SOLIDS SEPARATION

The air recirculation and solids separation equipment for cleaning air and returning it to the blower B is best illustrated in FIGS. 1–8. The blower B includes a housing 70 at the left side of the housing H and a radial vane rotor or impeller 71 mounted on a shaft 72 rotatable in bearings 73 carried by the housing 70. The impeller 71 is driven by an internal combustion engine 74 mounted on the frame 1 in front of the housing H through an engine pulley, not shown, and belts 75 and a pulley 76 on the rotor shaft 72, the pulleys and belts being enclosed in a casing 77.

The blower discharges peripherally through a discharge transition 78 to which the upper end of the pressure duct 2 is connected. The intake of air to the blower is through an axial inlet 79 which is curved in cross section as shown in FIG. 2 so as to direct inlet air to flow toward the blower axis of rotation as well as to flow generally in the direction of extent of the blower axis.

Air flowing upwardly from the right end of the pick-up head P through the suction duct 3 passes through a transition 80 into an entrance passage defined by a curved front and top wall 81, the right side wall 82 of the housing H, and a vertical inner wall 83 which extends rearwardly from the front wall 81 but terminates short of the rear end of the solids collection bin SCB. The forward part of the interior wall 83 is parallel to the wall 82 of the housing H, but the rear portion of the interior wall 83 is turned inwardly at 83a so that air emerging from the walled passage may flow toward the center of the solids collection bin SCB. Best results have been obtained with a construction in which the rear edge of the interior wall portion 83a is inclined from its bottom upwardly and rearwardly as at 83b.

Air emerging from the passageway flows rearwardly into the large volume of the solids collection bin SCB for delivery to the intake of the blower B in a particular manner described hereinafter. The heavier particles of trash or dirt fall of their own weight into the bottom of the bin SCB without being passed on to the blower intake. However, some light trash such as lint, leaves, bits of paper, strings or the like, frequently have a tendency to remain entrained in the air stream passing to the blower intake. The present invention provides for very efficient removal of such light debris. Disposed across the air inlet passageway is a vibrating separator extending from side to side of the passage and projecting downwardly from the passage top to just above the passage bottom. In the form shown, the vibrating separator is constituted by an assembly or complement of flexible reed-like elements 84 fixedly mounted at their upper ends at 85 and hanging downwardly unsupported so as to be capable of being deflected by the air stream and waving back and forth or vibrating in response to local air flow variations and being struck by fairly large pieces of trash. In operation, the reeds or similar elements, which may be formed of flexible plastic, are generally deflected at their lower end portions as indicated by the curvature shown in FIG. 4. Light pieces of trash are intercepted by the reeds and the vibration of the latter causes the trash pieces to slip down the reeds and to be dropped from the latter onto the bottom of the entrance passageway between the walls 82 and 83. The air stream flowing through the passageway moves the dropped light trash along the bottom of the collection bin toward the rear thereof with no consequential entrainment of the particles in the air stream passing to the blower intake.

Heavy trash pieces, for example rocks, cans, bottles or the like, are likewise carried rearwardly through the passageway between the walls 82 and 83. Since this passageway is at one side of the housing H, that is the right side, there would be a tendency for such heavy particles to be accumulated in one, the right, side of the collection bin with consequent overloading of the equipment on the right side. To prevent this, means are provided for deflecting the rearwardly flowing heavy pieces toward the longitudinal center line of the bin SCB. In the illustrated and preferred embodiment, this deflecting means is provided by a rock deflector baffle generally designated 86 positioned in the path of air flowing through and emerging from the flow passage between the walls 82 and 83–83a. The deflector 86 includes a top plate 87 which is inclined upwardly and inwardly toward the center of the bin SCB from front to rear, and a triangular end plate 88 for supporting the rear of the inclined plate 87. As shown in FIG. 8, the top edge 87a of the inclined plate 87 is flush against the housing wall 82, and the lower edge 87b is flush with the bottom of the bin SCB.

Air, still containing a substantial amount of solids in the form of entrained dust, sand particles or the like, moves from the upper part of the collection bin SCB forwardly for delivery to the blower intake. It is important to separate the entrained dust, sand, or other fine particles from the air before the latter reaches the blower intake. In the preferred construction, the air enters the blower by way of a generally cylindrical chamber 89 defined by a circumferential wall 90 and a closed right end constituted by part of the interior wall 83. The left end of the chamber 89 is in open communication with the blower intake 79. As is clear from FIG. 2, the chamber 89 is axially aligned with the blower impeller 71 and is axially much longer than its diameter. Air is caused to flow into the chamber 89 as explained below.

The bottom of the solids collection bin SCB is turned upwardly to provide a transverse partition 91, the upper edge of which is joined to the wall 90 along a line under the cylindrical chamber 89. The wall or partition 91 therefore restricts flow of air from the bin SCB to be above the chamber wall 90. Relatively large trash particles in the air flowing above the chamber wall 90 are intercepted by a screen 92 and are caused to fall to the bottom of the bin SCB. However, some fine particles may pass through the screen 92 and most of these should be removed from the air stream before the air is returned to the blower. This removal is accomplished by movement of the air within the chamber 89 in which the air both swirls around the chamber axis and travels parallel to the axis from right to left as viewed in FIG. 2. The swirling of the air in the chamber 89 is produced by introducing the air into the chamber tangentially by a curved guide baffle 93 which directs the air to flow with a venturi effect through a slot-like entrance opening 94 in the wall 90 tangentially into the chamber 89 and extending substantially parallel to the chamber axis. The entrance opening 94 extends the complete length of the wall 90 and chamber 89 so that air enters the chamber tangentially throughout its length. The air also flows axially with respect to the chamber due to the suction effect of the blower rotor 71. Thus, in total, the flow of air in the chamber 89 is along a generally spiral path.

The circular motion component of the air and entrained dust particles, and even any drops of moisture present, within the chamber 89 causes the particles to be thrown outwardly against the inside of the wall 90 to be discharged tangentially through a solids discharge slit 95 extending the length of the wall 90 and being angularly displaced about the axis of the chamber 89 from the entrance opening 94. Solids discharged through the slot 95 are intercepted by an overhanging solids deflecting baffle 96 so as to be deflected downwardly and be deposited in the solids collection bin SCB.

Controlling the flow of air into the chamber 89 is important for achieving the most efficient solids separation. In the construction shown, the curved guide baffle 93 is constituted by a smooth continuation of a part of the cylindrical wall 90, the continuation being of flatter curvature than the wall 90. In order to ensure that a major part of the air delivered to the chamber 89 will enter the chamber at the right end of the latter and continuously from the right end to its left end adjacent to the blower intake, the entrance opening 94 tapers in circumferential width from a minimum width adjacent the blower intake to a maximum width at the opposite end. In a typical construction, the entrance opening 94 tapers from a width of about two inches adjacent the blower intake to a width of about six inches at the opposite end. The tapering of the entrance opening 94 is due to inclining one edge 94a thereof as shown in FIGS. 2 and 4. The decreasing width of the opening 94 from right to left is also shown schematically in FIGS. 5, 6 and 7. The solids discharge slit 95 is of much less flow area than the entrance opening 94, having approximately one-quarter inch wide circumferentially of the wall 90.

The dust separation effected by the swirling of the air in the chamber 89 utilizes a mass in motion principle according to which the rapdily swirling masses of the dust particles are centrifugally moved outwardly against the chamber wall 90 for discharge through the slit 95. Only very light dust particles can remain in the air delivered to the blower intake. The continued entrainment of a moderate amount of only very light particles in the circulating air actually is advantageous in that the air containing such very fine particles is rendered heavier than air completely free of particles, with the result that the air discharged through the blast venturi orifice 45 against the surface to be cleaned has increased effectiveness in dislodging dirt for being picked up in the suction chamber of the pick-up head P.

SUMMARY OF OPERATION

Figure 20:
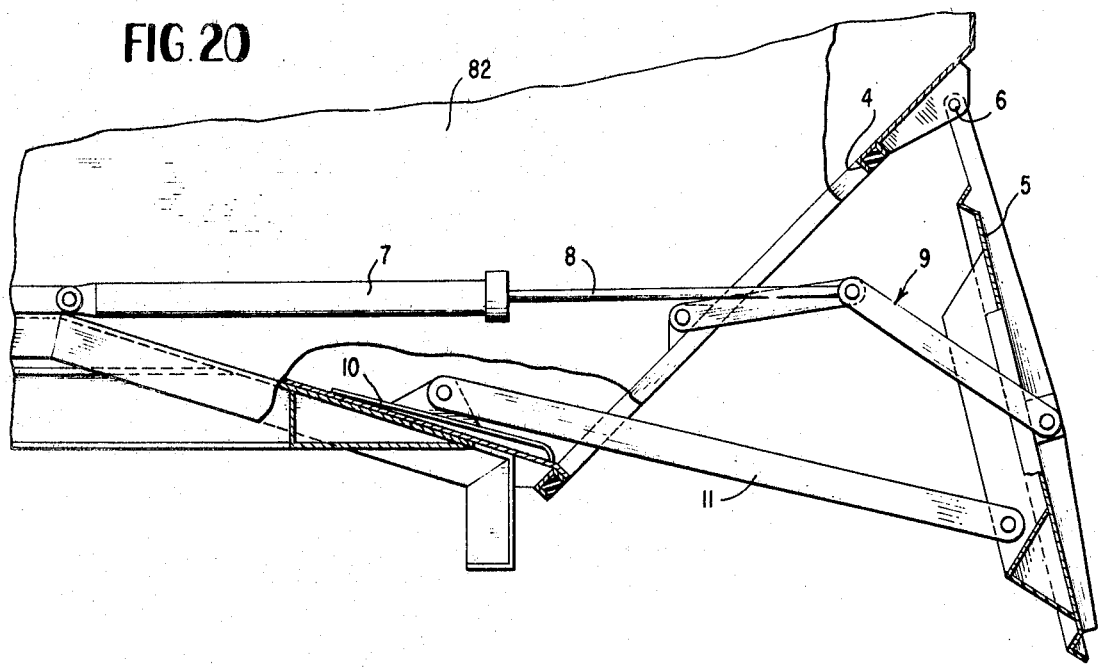
FIG. 20 is a view similar to FIG. 19, but showing the closure gate in its open position.

The descriptions of different phases of operation described above should render the operation of the complete apparatus as a unit readily apparent. However, a brief résumé of the overall operation may be helpful. The closure gate 5 being in closed position as shown in FIGS. 1 and 20, and the pick-up head P being lowered for engagement of the curtains with the surface to be cleaned, the truck T is progressed along the line of cleaning while the blower B is driven by the engine 74. Air delivered under pressure through the duct 2 and transition 48 passes horizontally into the pick-up head pressure chamber PC from which the air is blasted downwardly at an inclination through the orifice 45 to impinge upon the surface and loosen the dirt which is carried into the suction chamber SC. Air with entrained trash flows through the suction chamber SC to be exhausted through the transition 41 and duct 3 and to flow through the passageway between the housing wall 82 and the internal wall 83. In flowing through this passageway, relatively large but light pieces of trash are intercepted by the reeds 84 and dropped to the bottom of the solids collection bin SCB. Heavy pieces of trash are deflected by the deflector 86 to move toward the center of the bin SCB. Air containing entrained dust moves slowly in the upper part of the large volume bin SCB so that much of the still entrained solid material will drop to the bottom of the bin. Air still containing some entrained solids will pass through the screen 92 which intercepts relatively large pieces which are dropped to the bottom of the bin. Air containing only fine entrained solids enters the cylindrical chamber 89 in which it is subjected to a swirling and axial flow, causing most of the remaining particles to be discharged through the solids discharge slit 95, intercepted by the baffle 96, and dropped to the bottom of the bin SCB. Relatively solids-free air, containing only a moderate amount of extremely fine solids, is then received by the blower intake and recycled. Only under extremely dry conditions and when a great deal of very fine dust is to be picked up is it desirable to spray atomized liquid through the nozzle 67.

The disclosed construction embodies the invention in a preferred form, but it is intended that the disclosure be illustrative rather than definitive.

I claim:

1. In an air flow surface cleaning apparatus, a pick-up head mounted for movement in a path in a direction of cleaning progress over and adjacent to the surface to be cleaned, said pick-up head having a suction chamber within said pick-up head extending transversely of said path, said pick-up head having a top wall and being open at its bottom above the surface to be cleaned, narrow, continuously open slot orifice means extending transversely of said path substantially all the way across the width of said path adjacent only one edge of said suction chamber which edge is transverse to said path and is the rear edge of said suction chamber with respect to the direction of movement of said pick-up head in said path, and air guiding means disposed immediately adjacent said suction chamber rear edge and immediately in front of said orifice means and having its bottom surface spaced above the surface to be cleaned and spaced below said suction chamber top wall and extending transversely parallel to said orifice means, said orifice means being positioned so that its entire discharge is spaced below said suction chamber top wall and its direction of discharge is inclined to said surface toward said suction chamber and forwardly in the direction of movement of said pick-up head in said path, whereby air under pressure dicharged by said orifice means impinges on said surface and is deflected thereby and all of the air discharged from said orifice means flows horizontally under said air guiding means and forwardly in the direction of movement of said pick-up head in said path, and enters said suction chamber horizontally and spaced below said suction chamber top wall along a line extending transversely of said path; means for delivering air under pressure to said orifice means for discharge therethrough and thence horizontally under said air guiding means into said suction chamber spaced below said suction chamber top wall along said transversely extending line; and exhaust means for discharging air from said suction chamber, whereby air is caused to travel in said suction chamber both parallel to and transversely to said path substantially throughout the entire width of said suction chamber transversely of said path.

2. Apparatus according to claim 1 in which said orifice means and said air guiding means provide a venturi, whereby air flows at a maximum velocity when passing through the most narrow part of said venturi and is expanded upwardly with diminishing velocity into said suction chamber after flowing under said air guiding means.

3. Apparatus according to claim 2 in which said pick-up head comprises a pressure chamber extending transversely of said path adjacent to said suction chamber, and in which said pressure chamber extends substantially throughout the length of said suction chamber.

4. Apparatus according to claim 3 in which said exhaust means is connected to said suction chamber at one end thereof, and in which said means for delivering air under pressure comprises a duct communicating with said pressure chamber at the end of said pick-up head opposite the end thereof at which said exhaust means is located.

5. Apparatus according to claim 2 in which said exhaust means comprises a duct extending upwardly from one end of said suction chamber, and in which air direction changing means is positioned within said pick-up head at the junction of said duct and said suction chamber for turning air flowing horizontally in said suction chamber to flow upwardly into said duct, said air direction changing means comprising a vane positioned adjacent to the extremity of said one end of said suction chamber and lower than the top of said suction chamber at said one end thereof, said vane being spaced diagonally downwardly-outwardly from the junction of said suction chamber top wall with the portion of said duct which is spaced inwardly from said suction chamber end extremity, the cross sectional area of the space between said vane and said junction being less than the cross sectional area of said duct above said suction chamber.

6. Apparatus according to claim 2 in which said air guiding means is mounted to be spaced above the surface to be cleaned by from about one inch to about two inches.

7. Apparatus according to claim 2 including flexible ground engaging curtains carried by said pick-up head along the perimeter thereof and in which said ground engaging curtains include end curtain portions at opposite ends of said pick-up head, said end curtain portions extending in the direction of cleaning progress beyond said pick-up head whereby to inhibit trash pieces which do not readily pass under the curtain portion at the front of said pick-up head from moving transversely beyond and away from the latter.

8. Apparatus according to claim 2 including an apparatus frame, support means mounted on said frame above said pick-up head for adjustment on said frame transversely to the direction of travel of said frame over the surface to be cleaned, resilient means floatingly suspending said pick-up head from said support means for carrying part of the weight of said pick-up head, and downwardly extending flexible ground engaging means carried by said pick-up head and supporting the remainder of the weight of said pick-up head, adjustment of said support means adjusting the position of said pick-up head relatively to aid frame transversely to said direction of travel.

9. Apparatus according to claim 1 in which said exhaust means comprises a duct extending upwardly from one end of said suction chamber and in which the vertical area of the space between said air guiding means and the surface to be cleaned is approximately 70%–80% of the largest flow area of said duct.

10. An air flow surface cleaning apparatus according to claim 1 in which said means for delivering air under pressure includes a pressure chamber above said suction chamber and separated therefrom by said suction chamber top wall, said orifice means intervening between said pressure chamber and said suction chamber.

11. Apparatus according to claim 10 in which said exhaust means discharges air from one end of said suction chamber and in which said suction chamber decreases in cross section from said one end thereof to the opposite end thereof.

12. Apparatus according to claim 11 in which the bottom wall of said suction chamber is provided by said surface to be cleaned and in which said suction chamber top wall slopes downwardly from said one end of said suction chamber to said oposite end thereof.

13. Apparatus according to claim 10 in which said exhaust means discharges air from one end of said suction chamber and in which said pressure chamber increases in cross section from the one end of said pressure chamber adjacent said one end of said suction chamber to the opposite end of said pressure chamber.

14. Apparatus according to claim 13 in which said pressure chamber increases in height from said one end thereof to said opposite end thereof.

15. Apparatus according to claim 13 in which said pressure chamber increases in width from said one end thereof to said opposite end thereof.

16. Apparatus according to claim 13 in which said pressure chamber increases in both height and width from said one end thereof to said opposite end thereof.

17. Apparatus according to claim 13 in which said pressure chamber includes two vertical walls which converge upon each other toward said one end of said pressure chamber.

References Cited

UNITED STATES PATENTS

| | | | |
|---|---|---|---|
| 564,013 | 7/1896 | Furnas | 15—346 X |
| 985,945 | 3/1811 | Shea | 15—347 |
| 514,677 | 2/1894 | Furnas. | |
| 1,211,902 | 1/1917 | Warner. | |
| 1,229,737 | 6/1917 | Furnas | 15—340 X |
| 3,054,130 | 9/1962 | Ferraci | 15—340 |

FOREIGN PATENTS 588,799  2/1959  Italy.

ROBERT W. MICHELL, Primary Examiner

U.S. Cl. X.R.

15—340